(12) United States Patent
Schulte et al.

(10) Patent No.: US 9,662,667 B2
(45) Date of Patent: May 30, 2017

(54) FASTENING SYSTEM FOR INSTALLATION SHOWER HEADS

(71) Applicant: Grohe AG, Hemer (DE)

(72) Inventors: Michael Schulte, Menden (DE); Uwe Stoelzel, Menden (DE)

(73) Assignee: Grohe AG, Hemer (DE)

( * ) Notice: Subject to any disclaimer, the term of this patent is extended or adjusted under 35 U.S.C. 154(b) by 100 days.

(21) Appl. No.: 14/792,130

(22) Filed: Jul. 6, 2015

(65) Prior Publication Data

US 2015/0306609 A1 Oct. 29, 2015

Related U.S. Application Data

(63) Continuation of application No. PCT/EP2013/003796, filed on Dec. 16, 2013.

(30) Foreign Application Priority Data

Jan. 4, 2013 (DE) .................. 10 2013 000 030

(51) Int. Cl.
*B05B 1/18* (2006.01)
*E03C 1/04* (2006.01)
*F16M 13/02* (2006.01)

(52) U.S. Cl.
CPC ............ *B05B 1/185* (2013.01); *E03C 1/0408* (2013.01); *F16M 13/027* (2013.01)

(58) Field of Classification Search
CPC ...... E05C 19/18; E05C 19/184; E05C 19/186; E05C 19/188; B65D 45/00; B65D 45/02; B65D 45/04; B65D 45/06; B65D 45/10; B65D 45/16; B65D 45/20; B65D 45/24; B65D 90/10; B65D 90/105; F21V 21/045; F21V 21/046; E03C 1/0408; B05B 1/185
USPC ............ 4/615, 632–634, 648, 649; 292/256, 292/256.6, 256.65, 256.69, 257; 248/220.21, 221.11, 222.11, 231.9; 239/282, 283
See application file for complete search history.

(56) References Cited

U.S. PATENT DOCUMENTS

2012/0281410 A1   11/2012   Wong

FOREIGN PATENT DOCUMENTS

| DE | 10 2009 057 443 A1 | 6/2011 |
| DE | 10 2010 026 485 A1 | 1/2012 |
| EP | 1 686 418 A1 | 8/2008 |
| EP | 2 570 557 A1 | 3/2013 |

*Primary Examiner* — Erin Deery
(74) *Attorney, Agent, or Firm* — Muncy, Geissler, Olds & Lowe, P.C.

(57) ABSTRACT

A fastening system for installation shower heads for installing in a wall or ceiling, including a shower head housing and water-conductor for connecting at least one water connection to at least one jet creator. The shower head housing is connected to a transmission device having an input side and an output side, which converts a first motion on the input side into a reciprocating motion in the installation direction on the output side, and the output side is connected to the wall or ceiling by a fastener.

11 Claims, 4 Drawing Sheets

ID_9,662,667_B2

FASTENING SYSTEM FOR INSTALLATION SHOWER HEADS

This nonprovisional application is a continuation of International Application No. PCT/EP2013/003796, which was filed on Dec. 16, 2013, and which claims priority to German Patent Application No. 10 2013 000 030.0, which was filed in Germany on Jan. 4, 2013, and which are both herein incorporated by reference.

BACKGROUND OF THE INVENTION

Field of the Invention

The present invention relates to a fastening system for built-in shower heads.

Description of the Background Art

Built-in shower heads, which are intended for installation in suspended ceilings or in walls, are known. In known ceiling-mount shower heads, the hydraulic connection between the water inlet of the built-in shower head and the house connection line typically also serves to mechanically connect the built-in shower head to the water-carrying structure. Moreover, large-size ceiling-mount shower heads require connection geometries with very large dimensions in order to be able to accommodate the weights that arise as well as dynamic loads. An additional disadvantage is that the position of the ceiling-mount shower head is also determined largely by the position of the supply pipe.

Moreover, in comparison to designs that have hitherto been customary, some modern built-in shower heads have significantly higher weights. Prior art fastening systems are increasingly stretched to their limits on account of the higher weights.

SUMMARY OF THE INVENTION

It is therefore an object of the present invention to solve the problems arising from the prior art, and in particular to specify a fastening system that ensure easy assembly and secure retention, even for very heavy built-in shower heads. Moreover, the faucet should be economical to produce and must be reliable.

In an exemplary embodiment, an object is attained by a fastening system that is distinguished by the fact that the shower head housing is connected to a transmission device with an input side and an output side that converts a first motion at the input side into a lifting motion in the direction of installation at the output side, and the output side is connected to the wall or ceiling by a fastener. The use of a transmission device makes it possible to generate very high fastening forces at the output side of the transmission device with relatively small actuating forces at the input side of the transmission device. This is achieved through reduction of the motion at the input side relative to the lifting motion at the output side. In addition to the force amplification achieved through the reduction, the transmission device can also achieve a redirection, so that the motion at the input side is entirely different from the lifting motion required for fastening the built-in shower head. The lifting motion here can correspond to a motion that the built-in shower head makes on the way to the installed position. As an example, this can be a cutout in the wall or ceiling, with the lifting motion in this case taking place in the perpendicular direction, which is to say at right angles to the wall or ceiling. In the case of a ceiling, the lifting motion thus corresponds to the vertical. Due to the use of the transmission device and the redirection, even especially heavy variants of built-in shower heads can thus be fastened securely, since the high holding forces are applied by the transmission device. Moreover, installation is facilitated since the motion at the input side can be oriented in such a manner that it is especially easy for the installer to perform.

To this end, the first motion can be a rotary motion. An installer can carry out such a rotary motion in an especially easy manner by, for example, a screwdriver, hex wrench, or electric screwdriver.

In addition, to simplifying the installation it is preferred for the fastener to comprise at least one hook and at least one associated catch. The embodiment in which the hook is located at the output side of the transmission device and executes the lifting motion is especially preferred here. The hook can engage a catch on the wall or ceiling side in an undercut manner for the purpose of fastening. For its part, the catch can be implemented in an especially simple manner as a ring, eye, or opening in a sheet metal part, which in each case is attached to the wall or ceiling. It is especially economical and simple for the fastener to have a sheet metal angle that is attached to the ceiling and of a hook attached to the transmission device that engages at least one opening of the stationary sheet metal angle.

It is additionally advantageous for safety when especially heavy built-in shower heads are used for an additional securing device to be provided that acts in the event of unintentional release of the fastener or transmission device. It is especially beneficial here if the additional securing device can be implemented as a safety cable that is securely attached on one end to the built-in shower head, and on the other end is securely attached to the ceiling. The length of the safety cable is dimensioned such that it permits the lifting motion required for installation. During installation, the safety cable can then be installed at both ends with the built-in shower head still in the lowered state, to subsequently be completely enclosed by the built-in shower head after the lifting motion has taken place. In this way, the safety cable is fully enclosed and is no longer visible from outside.

In addition, it is advantageous for the first motion to be a rotary motion whose axis of rotation is oriented in the direction perpendicular to the lifting motion. With a rotary motion whose axis of rotation is essentially at right angles to the lifting motion, installation can be carried out from one side of the built-in shower head. Only lateral openings are necessary for this purpose, for example in order to act on the input side of the transmission device with a tool or other manipulator. The openings can thus be placed on the side of the built-in shower head and hence outside the directly visible area. Even very small openings are sufficient here, for example in order to act on a screw with a hex key, so that the area of the visible surfaces is only marred by very small openings. In addition to an exact right-angle orientation, the axis of rotation can also be inclined slightly relative to the ceiling or wall, for example by 5° to 20°, achieving a larger spacing that facilitates installation using tools.

In an embodiment, provision is additionally made for the transmission device to have at least one pivoted lever that is supported so as to pivot about a pivot axis, wherein a first side of the pivoted lever is designed as part of the fastener and a second side has a slotted link with at least one sliding block guided therein. While the first side is implemented as a hook, for example, which executes the lifting motion during advance of the transmission device, the opposite end of the pivoting lever can be driven by a linear motion of the sliding block, which is capable of moving inside the slotted link and relative to the pivoted lever. It should be noted here that it suffices on the first side of the pivoted lever if a hook attached thereto carries out only an approximation of a lifting motion. It is not strictly necessary for a linear motion of the hook to be implemented exactly. Through the use of a slotted link with a sliding block, the redirection of the first motion at the input side of the transmission device can be implemented at the second side of the transmission device in a wide variety of directions. Consequently, this produces an especially high degree of freedom in the design of the transmission device.

It has proven especially beneficial in this context, particularly for ceiling mounting, for the pivot axis of the pivoted lever to lie in, for example, a horizontal plane. In the case of wall mounting, a vertical plane parallel to the wall would then be provided instead of the horizontal plane.

In addition, the sliding block can be guided by a guide along a path of motion, for example, in a horizontal direction, and to be movable by the rotary motion. In the case of ceiling mounting, the path of motion can thus be parallel to the ceiling, and the sliding block can be moved in alternation along this path of motion by suitable rotation. In consequence, the pivoted lever is then rotated about the pivot axis by the guided motion of the sliding block. This is achieved in that during this motion the sliding block moves relative to the slotted link provided in the pivoted lever. In addition to the described embodiment with a slotted link located in the pivoted lever, an opposite principle can also be used. In that case, provision is made to move a slotted link relative to the pivoted lever, and the sliding block is implemented on the pivoted lever. In addition to the exemplary horizontal orientation of the path of motion that has been described, this orientation can also be inclined in a range from 0° to 30° relative to the ceiling or wall. Simplified access is achieved for a tool applied at an angle, for example, especially through pivoting downward away from a ceiling. In particular, an inclination of 5° or 10°, for example, is suitable for creating improved access for execution of the first motion via a tool, since an additional spacing from the ceiling is created in a lateral region of the built-in shower head.

In addition, it has proven to be of value for the sliding block to have an internal thread that stands in engagement with a rotatable screw that is fixed in the longitudinal direction. Such a screw can have a tool engagement implemented as a hex socket, for example, and is attached to the built-in shower head such that it can rotate while at the same time being fixed in the longitudinal direction. Depending on the embodiment selected, the sliding block or the slotted link, each of which is provided with an internal thread and stands in engagement with the screw, can be moved along the path of motion by the screw. Moreover, an especially large reduction can be achieved through the use of the screw, making even heavy shower heads easy to install.

Further, an object of the invention can be attained with a built-in shower head having a fastening system since this ensures especially simple installation and secure retention in the installed position.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
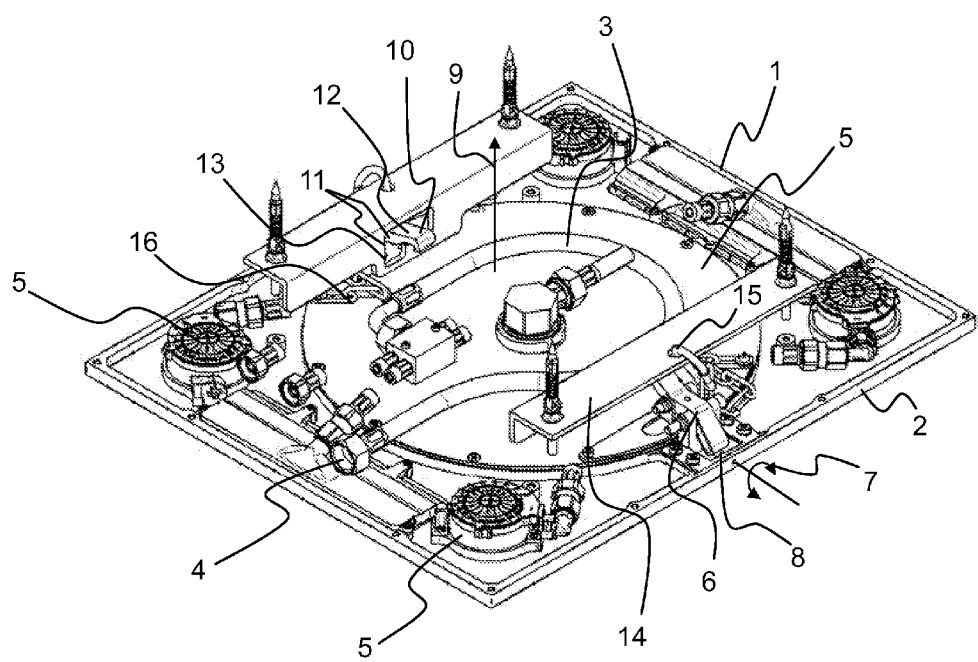
FIG. 1 is an oblique view of a built-in shower head according to an exemplary embodiment of invention with a fastener.

FIG. 1 shows a built-in shower head 1 according to the invention in an oblique view from above. The built-in shower head 1 includes a shower head housing 2, water-carrier 3, a water connection 4, and multiple spray faceplates 5. Located on each of two opposite sides is a transmission device 6 that converts a first motion 7 at an input side 8 into a lifting motion 9 at an output side 10 of the transmission device 6. The output side 10 of the transmission device 6 is simultaneously implemented as part of a fastener 11, which has a hook 12 and a catch 13. The catch 13 is stamped as an opening in a piece of angled sheet metal 14. The sheet metal 14 additionally has a hole 15, where one end of a chain is attached as a securing device 16. The chain is also connected at its opposite end to the shower head housing 2. The length of the chain is dimensioned such that during installation the securing device 16 is first attached at both ends in order to subsequently insert the hook 12 in the catches 13 and carry out the lifting motion 9.

Figure 2:
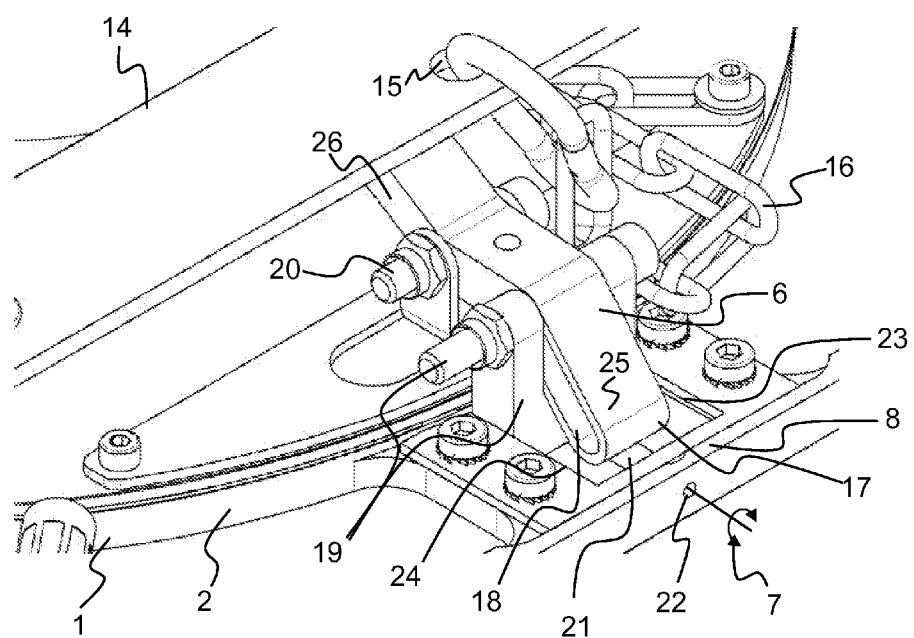
FIG. 2 is an enlarged partial view of the built-in shower head from FIG. 1.

FIG. 2 shows the transmission device 6 with the securing device 16, again in an enlarged view. The transmission device 6 has a pivoted lever 17 with a slotted link 18. Located in the slotted link 18 is a sliding block 19, which in the embodiment shown is implemented as a stud with a U-shaped sliding body. The pivoted lever 17 is mounted so as to be rotatable about a pivot axis 20. A screw 21 that is mounted so as to be rotatable and is fixed in the axial and lateral directions is provided for actuating the transmission device 6. The screw 21 can be rotated by via a screwdriver, not shown, through a tool opening 22. The screw 21 thus forms the input side 8 of the transmission device 6, and is actuated through the first motion 7 in the form of a rotary motion.

The attached figures are used to explain in even greater detail the way the screw 21 interacts with the movable sliding block 19, which can be moved by a guide 23 in the horizontal direction along a path of motion 24. It is evident from FIG. 2 that as soon as the sliding block 19 moves away from the pivot axis 20, a first side of the pivoted lever 17 is moved upward, away from the shower head housing 2, as a result of the interaction between the sliding block 19 and the slotted link 18. At the same time, a second side 26 of the pivoted lever 17 is moved downward. The situation shown in FIG. 2 corresponds to a preinstalled state with lowered built-in shower head 1.

Figure 3:
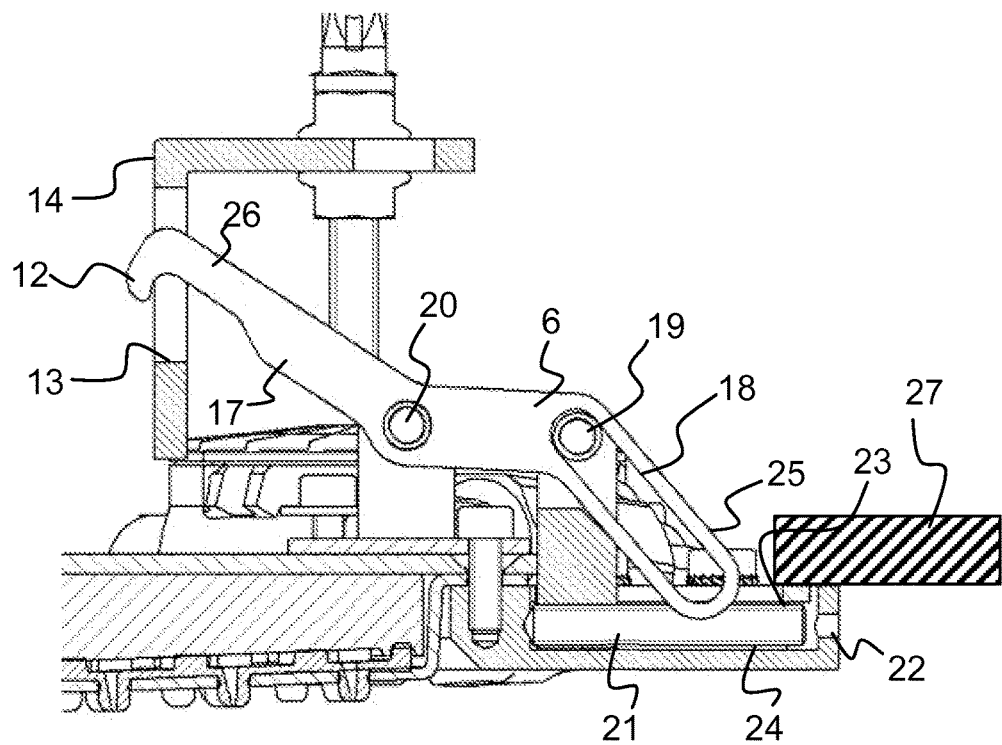
FIG. 3 is a cross-sectional view of the fastening system from FIG. 1 in an open state.

FIG. 3 shows a cross-sectional view through a transmission device 6 according to the invention in the opened state. The angled sheet metal 14 with the catch 13 is fastened to a ceiling 27 with a fastener. The second side 26 of the hook 12 engages the catch 13 of the sheet metal 14. The way that the screw 21 can be actuated through the tool opening 22 via a tool is also clearly discernible in this view.

In the example shown, the screw 21 is implemented as a setscrew with a hex socket. It is also evident in the cross-sectional view that the guide 23 for the sliding block 19 are implemented as a tongue and groove joint. The sliding block 19 is thus guided, and can move along the path of motion 24.

Figure 4:
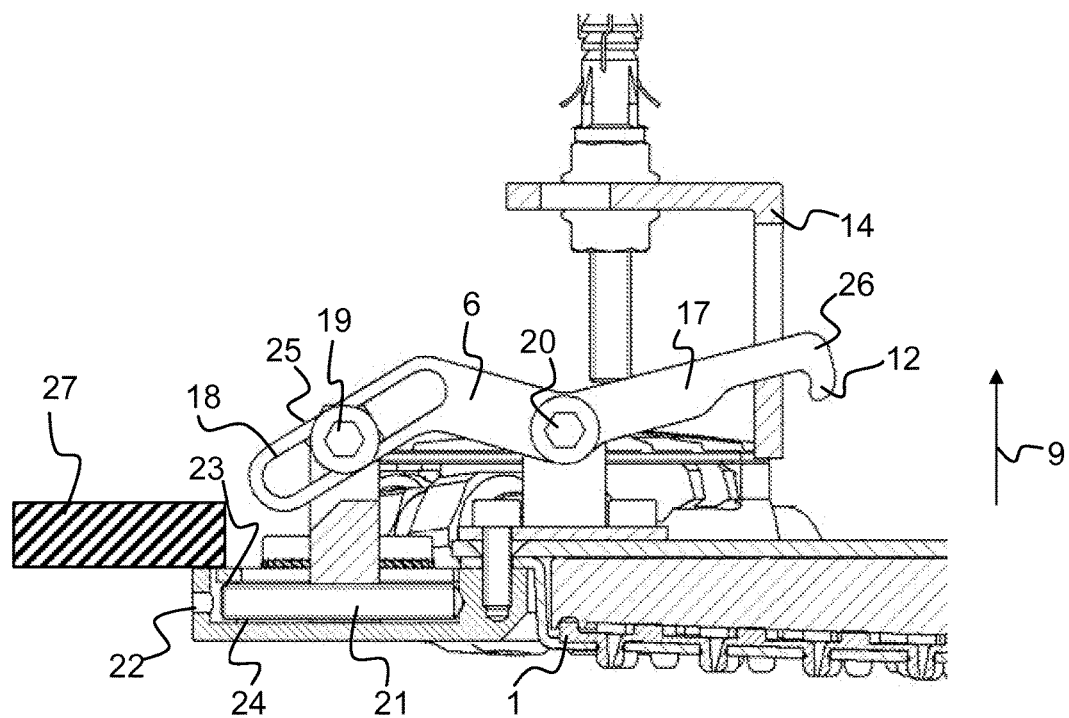
FIG. 4 is a cross-sectional view of the fastening system from FIG. 1 in a closed state.

Lastly, FIG. 4 shows another embodiment of a fastening system according to the invention in a fully installed state, and consequently in the installed position. The sliding block 19 is moved to the left by the screw 21, causing the first side 25 of the pivoted lever 17 to move upward toward the ceiling 27. Due to the simultaneous lowering of the hook 12 on the second side 26 of the pivoted lever 17, the entire built-in shower head 1 is moved in the direction of the lifting motion 9 toward the ceiling 27.

With the present invention, even especially heavy built-in shower heads can be attached to ceilings or walls securely and with little installation effort. Moreover, the external appearance of the built-in shower head 1 is only marred by very small tool openings. In addition to the horizontal orientation of the screw 21 and the tool opening 22 shown, it is also possible to place them inclined by an angle of inclination $\alpha$ so that a tool can be inserted more easily into the tool opening 22 from a position located below the built-in shower head 1. The angle $\alpha$ between the wall or ceiling and the longitudinal axis of the screw 21 should be between 0° and 45°, preferably between 5° and 30°. This facilitates operability since the grip end of the inserted tool is thus located further from the ceiling 27, and gives the installer more space for manual installation.

Lastly, it should be noted that the present invention is not limited to the exemplary embodiments shown. Rather, numerous variations of the claims are possible within the scope of the invention. Thus, for example, other transmission principles can be used within the scope of the present invention in place of the transmission device 6 with a pivoted lever and a sliding block guide. Worm drives and spindle drives, such as are used in car jacks, may be cited here by way of example. Moreover, additional guide(s) that ensure a defined horizontal lifting motion can be provided for lateral installation in a wall.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A fastening system for built-in shower heads for installation in a wall or ceiling, the system comprising:
    a shower head housing;
    a water-carrier connecting at least one water connection to at least one spray face-plate,
    an angled sheet metal part for connecting the shower head housing to the wall or the ceiling; and
    a transmission device connected to the shower head housing, the transmission device having an input side and an output side that converts a first motion at the input side into a lifting motion in a direction of installation at the output side, the output side being connected to the angled sheet metal part,
    wherein the output side of the transmission device comprises at least one hook and the angled sheet metal part includes at least one associated catch that is an opening through which the at least one hook is inserted, and
    wherein the transmission device has at least one pivoted lever that is supported so as to pivot about a pivot axis, wherein a first side of the pivoted lever includes the at least one hook, and a second side of the pivoted lever has a slotted link with at least one sliding block guided therein.

2. The fastening system according to claim 1, wherein the first motion is a rotary motion.

3. The fastening system according to claim 1, wherein a securing device is provided, one end of the securing device being attached to the angled sheet metal part and a second end of the securing device being attached to the shower head housing.

4. The fastening system according to claim 1, wherein the first motion is a rotary motion whose axis of rotation is oriented in a direction substantially perpendicular to the lifting motion.

5. The fastening system according to claim 1, wherein the pivot axis lies in a horizontal plane.

6. The fastening system according to claim 1, wherein the at least one sliding block is guided by a guide along a path of motion in a horizontal direction, and is movable by the first motion, the first motion being a rotary motion.

7. The fastening system according to claim 1, wherein the at least one sliding block stands in engagement with a rotatable screw that is fixed in a horizontal direction.

8. The fastening system according to claim 1, wherein the slotted link of the pivoted lever is an elongated opening.

9. The fastening system according to claim 1, wherein the pivot axis of the pivoted lever is provided at a position that is offset from the slotted link of the pivoted lever.

10. The fastening system according to claim 9, wherein the position of the pivot axis of the pivoted lever is provided between the first side of the pivoted lever including the at least one hook and the second side of the pivoted lever having the slotted link.

11. A built-in shower head comprising the fastening system according to claim 1.

* * * * *